Dec. 7, 1937.  W. D. BRENKERT  2,101,638
VENTILATING SYSTEM FOR ARC LAMPS
Filed March 2, 1937  3 Sheets-Sheet 1
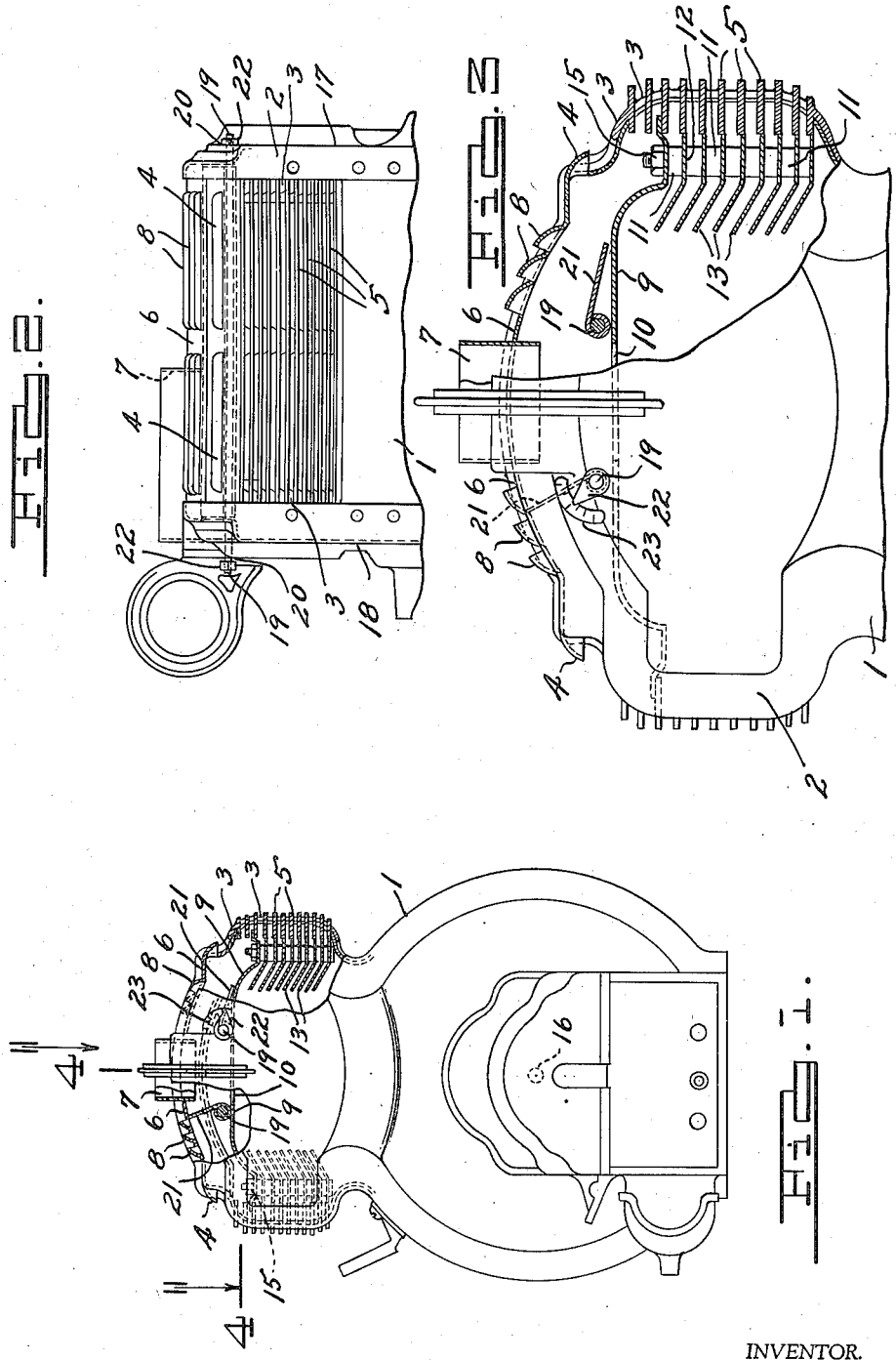
INVENTOR.
Wayne D. Brenkert
BY Samuel Wereman
ATTORNEY.

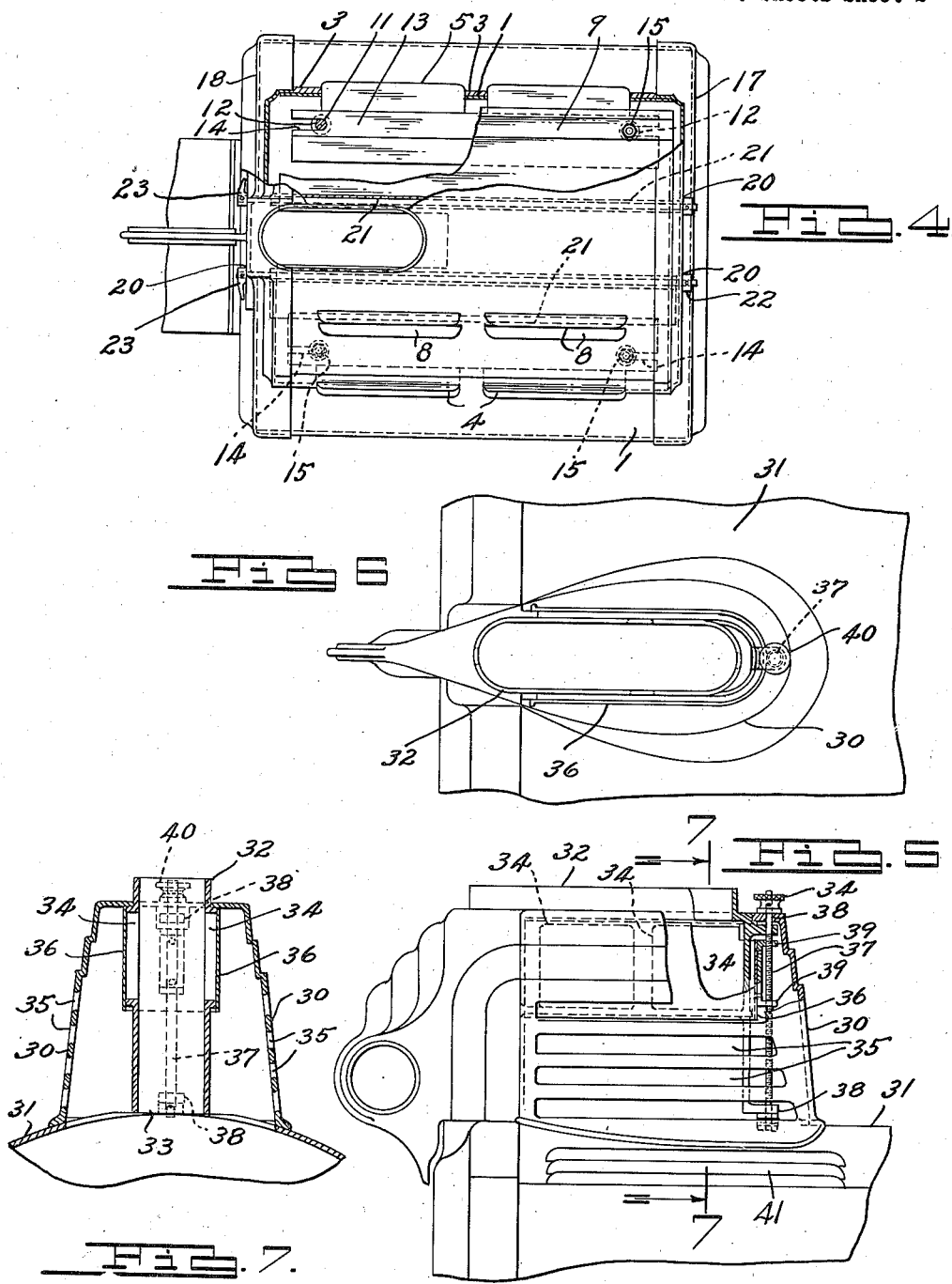

Dec. 7, 1937.  W. D. BRENKERT  2,101,638
VENTILATING SYSTEM FOR ARC LAMPS
Filed March 2, 1937  3 Sheets-Sheet 3
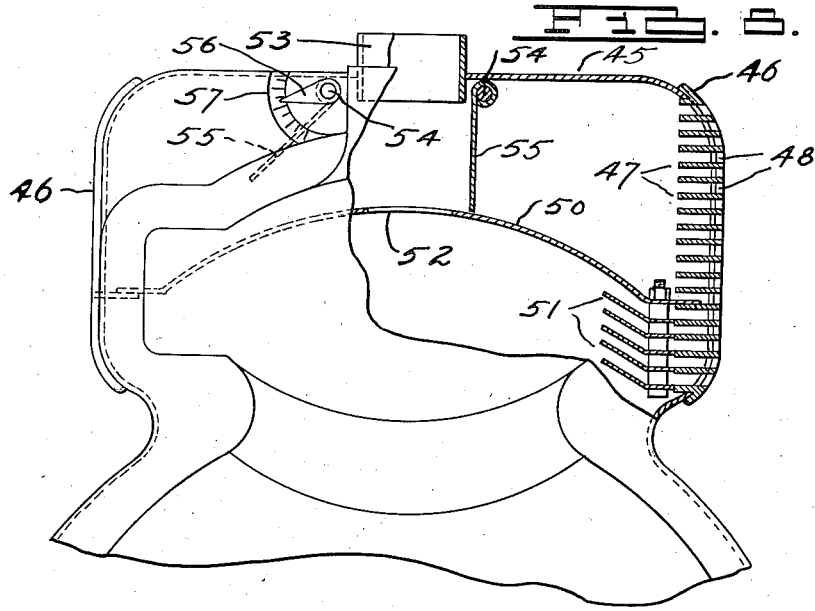
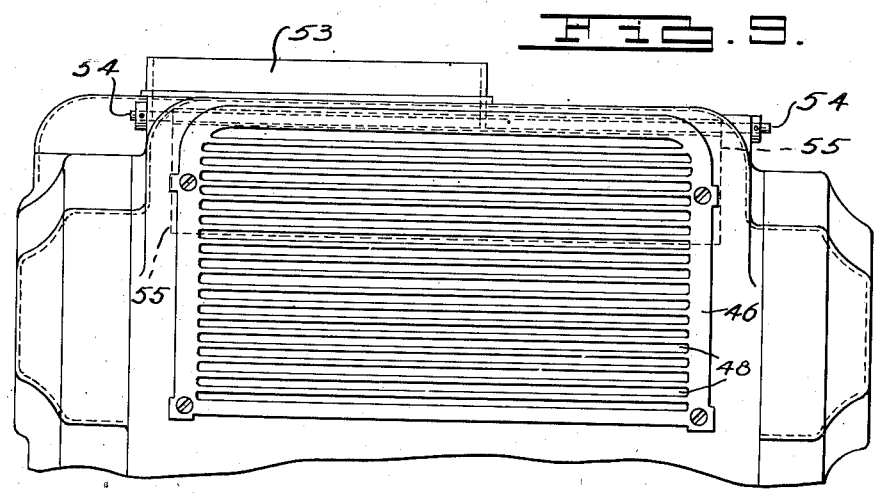
INVENTOR.
Wayne D. Brenkert
BY Samuel Weisman
ATTORNEY.

Patented Dec. 7, 1937

2,101,638

UNITED STATES PATENT OFFICE 2,101,638

VENTILATING SYSTEM FOR ARC LAMPS

Wayne D. Brenkert, Detroit, Mich., assignor to Brenkert Light Projection Company, Detroit, Mich., a corporation of Michigan Application March 2, 1937, Serial No. 128,657

10 Claims. (Cl. 176—115)

The present invention pertains to a novel ventilating system for the housing of a projection lamp of the arc type and resides primarily in a novel construction of the housing to accomplish the desired results.

High intensity lamps of this character operating on a comparatively high amperage of 70 to 125 amperes at 45 to 70 volts require approximately 100 cubic feet of air per minute for proper ventilation. At present there is a tendency to operate high intensity lamps at lower current values, namely, 30 to 50 amperes and 25 to 35 volts. Such lamps are known as high intensity, low amperage lamps. Because of the lower current characteristics, the arc is more sensitive than when higher current values are used, and consequently is likely to be blown about when subjected to the volume and velocity of air required for proper ventilation. More specifically, the low amperage arc can resist a maximum of about 30 cubic feet of air per minute without being blown about, whereas the quantity of air required to ventilate the housing and chimney properly and clear it of ash is between 100 and 300 cubic feet per minute.

It is highly important that the arc be maintained in a stable condition, especially in an optical system of high efficiency which permits very little tolerance in the position of the arc.

The object of this invention is to provide a ventilating means that furnishes sufficient air to clear the housing and chimney of the ash produced in the burning of the electrodes, and at the same time maintains the flame in a stable condition.

Another object is to dispense with the usual flue damper, the objection to which is that it always constitutes at least a partial obstruction resulting in accumulation of ash and soot which eventually clog the system or are thrown back into the lamp housing when jarred.

These objects are accomplished, generally, by providing means for admission of air into the lamp housing at three different rates: first, a low velocity of the arc to support combustion and permit the ash to rise with the convection currents; second, a higher velocity in the upper part of the housing to lift the smoke and ash to the flue; and third, a still higher velocity in the top of the housing to clear the flue and chimney which are frequently so long as to require a substantial draft to prevent accumulation of solid matter therein.

The high velocity air is controlled by a means outside of the chimney, to be adjusted or cut off entirely according to the capacity of the exhaust system, and without introducing any obstruction in the flue.

The invention is fully disclosed by way of example by the following description and the accompanying drawings, in which Figure 1 is an end view of a lamp housing constructed according to the invention, certain parts of the novel structure being shown in section;

Figure 2 is a side elevation of the lamp housing;

Figure 3 is an enlarged detail of Figure 2;

Figure 4 is a plan view of the housing, sectioned on the line 4—4 of Figure 1;

Figure 5 is a fragmentary side elevation, partly in section, of a modified construction;

Figure 6 is a plan view thereof;

Figure 7 is a section on the line 7—7 of Figure 5;

Figure 8 is an end view of another modification; and

Figure 9 is a side elevation thereof.

Reference to these views will now be made by use of like characters that are employed to designate corresponding parts throughout.

In Figures 1, 2, 3, and 4, is shown a lamp housing of substantially standard design and designated generally by the numeral 1. The upper part of the housing is widened at 2 to provide a ventilating zone. For the purpose of this invention, the sides of the chamber may be formed as separate plates 3 formed with louvers 4 for the admission of air as will presently be described. Horizontal air guides 5 are provided at the louvers and may be made integral with the plates 3 if desired. Preferably the louvers 4 run lengthwise of the housing and are arranged in two columns as may be seen in Figure 2. Preferably, the baffles 5 are cast integral with each plate 3 to define the louvers 4.

The roof 6 of the housing is secured across the upper edges of the plates 3 and has a flue 7 set therein in directly over the position of the arc. The roof is formed with lengthwise louvers 8 for admitting outside air through the roof and into the lower end of the flue 7 for a purpose that will presently be described.

Across the upper part of the lamp housing is laid a partitioning baffle 9 supported in any suitable manner. It may, for example, be suspended across two of the upper baffles or fins 5 of the plates 3, as illustrated in Figure 1. The baffle 9 is formed with an opening 10 directly below the flue 7 and of substantially the same area.

Spacer bolts 11 are suspended from the ends of the baffle 9 at both longitudinal edges. These are notched at 12 (Figure 4) at intervals equal to the spacing of the baffles 5, and in the notches are inserted angular deflectors 13 slotted at their ends at 14 for this purpose. The deflectors 13 abut the inner edges of the baffles 5, as shown in Figure 1, extending a distance horizontally inward of the housing and then upwardly. They fit tightly in the notches 12 of the spacer bolts 11 and need not be otherwise secured to the baffles 5 inasmuch as the nuts 15 clamping the spacer bolts to the baffle 9 hold the assembly in a rigid position. The arc is formed at the level of the electrode designated by the numeral 16 in Figure 1, and the upward slope of the deflectors 13 consequently bars light from escaping through the louvers. It will be understood that, in conjunction with the side walls of the housing and the roof 6, the enclosure of the interior of the housing is completed by forward and rear end walls 17 and 18 respectively.

At each longitudinal edge of the opening 10 in the baffle 9 is mounted a shaft 19 extending the entire length of the housing and journaled in suitable bearings 20 on the end walls 17 and 18. Each shaft 19 carries a valve 21 in the form of a rectangular plate also extending the entire length of the interior of the housing. Each shaft carries a knob 22 at its rear outer end, cooperating with a suitable indicator 23 on the rear wall 18. The width of the valves is such that, when raised, they engage the roof 6 at a short distance from the sides of the flue 7. There is no louver 8 in this distance or spacing. The valves in this closed position therefore prevent flow of air from the louvers 8 to the flue 7. Similarly, those louvers 4 lying above the longitudinal edges of the baffle 9 are also closed to the flue 7 when the valves 21 are closed. The knobs 22 are used for manually adjusting the valves to an extent indicated on the sectors 23 for a purpose that will now be described.

It has already been stated that in a high intensity, low amperage lamp the arc would be blown by a stream of air having a velocity exceeding twenty to thirty feet per minute, while a velocity of one hundred to three hundred feet per minute is necessary for proper ventilation of the housing. The problem is further complicated by the capacity of the exhaust system connected to the flue which capacity may be as high as twelve hundred feet per minute, and over which the operator of the lamp has no control. Such capacity of the exhaust system would obviously blow the arc, and accordingly the excess capacity is at the present time cut down in the lamp housing by means of a damper in the flue. This damper is highly objectionable in that it throws an accumulation of ash into the housing, eventually interfering with the operation of the mechanism, and also throws the gases of combustion back into the lamp housing and the projection booth, where these gases are detrimental to the health of the operator. Under these conditions, the operator opens the damper wider than permissible for the benefit of the arc, and the quality and efficiency of the light projected from the lamp is reduced.

It is to be noted that in the construction herein described, there is no damper in the flue. The comparatively low velocity of air permissible at the arc is supplied by the exhaust system pulling through leaks in the lower part of the lamp housing.

The ventilating zone in the present construction defined laterally by the plates 3, and extends upward as far as the baffle 9. Here the smoke accumulates as a result of the comparatively restricted flue, and the higher velocity of 100 to 300 feet per minute is required to carry the smoke to the flue. Such velocity, moreover, is permissible inasmuch as it does not interfere with the arc. However, the length of the chimney is frequently so great as to require a considerably higher velocity of air to prevent clogging by accumulation of solid matter therein. In prior practice, if the exhaust system is capable of producing the necessary high velocity, as it usually is, it will blow the arc, in which case it is reduced by a damper in the flue. A damper is objectionable in that it induces accumulation of solid matter in the flue, which accumulation restricts the flue opening or is occasionally thrown back into the housing.

In the present invention, the full capacity of the exhaust system, if necessary, may be used to clear the chimney, by admission of air externally of the ventilating zone above the baffle 9, in the present instance through the louvers 8 and the louvers 4 above the baffle 9, although the air admission means above the baffle may take other forms. With the valves 21 open, the air thus admitted flows directly to the flue 7 (i. e., externally of the ventilating zone) and clears the chimney, without affecting the arc and at the same time dispensing with the need of a damper in the flue. During such flow of air past the valves 21, the baffle 9 also prevents the formation of eddy currents and back drafts that might interfere with the arc.

The areas of the air admission ports and the resistances to air flow above and below the baffle 9 are so related and determined that the velocity below the baffle may be maintained between 100 and 300 cubic feet per minute notwithstanding a much higher velocity above the baffle, especially on adjustment of the valves 21. When the capacity of the exhaust system is not such as would ordinarily require throttling, the valves may be closed against the roof 6 so that no air is admitted above the baffle 9.

In the modification shown in Figures 5, 6, and 7, the same results are accomplished by a different construction including a tubular member 30 mounted upon the housing 31, while the previous construction adds little or no height by virtue of the novel ventilation system. The member 31 receives the flue 32 which extends to a suitable opening 33 in the roof 31 as may be seen in Figure 7. The upper portion of the flue 32 has several openings 34 of substantial area, and the member 30 is formed with slots or louvers 35 through which outside air may be admitted through the openings 34 and the flue 32. As in standard practice, a chimney is connected to the upper end of the flue and also to the intake side of a suitable exhaust system.

A valve 36 in the form of a U-shaped sheet or cuff is slidably mounted on the flue 32 and is adapted to obstruct the openings 34 almost completely from the louvers 35. The height of this member is only slightly greater than that of the openings so that it may be lowered to uncover the openings completely, as may be seen in Figure 7.

For adjusting the valves 36 vertically, a screw rod 37 is journaled in bearings 38 preferably carried by the member 30. The screw passes through tapped nuts 39 carried by the valve 36. The upper end of the screw 37 is exposed above the top of the member 30 and carries an adjusting knob 40. The openings 34 may be covered or uncovered to a desired degree by the valve 36 on turning the screw 37 at the knob 40.

As in the previous construction, an uncontrolled quantity of air is admitted to the top of the housing through louvers 41 in the side wall. This supply of air carries the smoke to the flue. When the capacity of the exhaust system is such as would ordinarily require throttling, air is admitted through the louvers 35 and openings 34 to the flue 32, on proper adjustment of the valve 36, with the result that the full capacity of the exhaust system is available for clearing the chimney, without blowing the arc and without the use of a damper, as in the previously described construction.

In the modification shown in Figures 5 to 7, the roof of the housing 31 serves the purpose of the baffle 9 in the other figures, that is, to separate the high velocity and low velocity zones. In both constructions, the air intake means below the baffle 9 or roof, as the case may be, is considerably more restricted than the valve-controlled intake means, to such extent that when the exhaust system draws as much as twelve hundred feet per minute, the intake means in the proximity of the ventilating chamber will not admit more than the permissible velocity for arc stability. The comparative restriction of the admission means at the ventilating chamber is introduced in a manner well known in the art, as by means of the area of the admission openings, resistances in the air path such as the baffles 5 and the deflectors 13, angular obstructions in the air path, or a combination of these factors.

In the constructions shown in Figures 8 and 9, the roof 45 of the housing is somewhat higher than in the standard housings shown in the preceding figures. This construction does away with the roof louvers of Figures 1 to 4 and with the superimposed tubular member 30 of Figures 5 to 7, inasmuch as the necessary port area may be provided in the sides of the housing in the ventilating zone. These sides which are obviously higher than formerly because of the higher roof, consist of castings 46 with inwardly extending baffles 47 defining the ports 48. The partitioning baffle 50 is laid across two of the lower baffles 47, leaving the major part of the port area above the baffle 50. Deflectors 51 are mounted adjacent to the baffles 47 below the member 50 in the manner and for the purpose described in connection with Figures 1 to 4. The baffle 50 also has an opening 52 directly over the arc position, and above the opening is mounted a flue 53 having its lower end spaced from the baffle 50. As in Figures 1 to 4, the opening 52 has substantially the same area as the flue.

At each side of the flue is journaled a shaft 54 carrying a shutter valve 55 adapted to close against the baffle 50, thereby obstructing communication between the flue and those ports or louvers above the partitioning baffle, as in Figures 1 to 4. The rear end of each shaft 54 carries a pointer knob 56 cooperating with a dial 57 on the lamp housing to indicate the position of the valve.

In this construction, back draft in the chimney is less likely to expel smoke through the louvers above the partitioning baffle than through the roof louvers of Figure 1, inasmuch as the latter are nearer to the flue. Further, the construction is simpler inasmuch as all the louvers at each side are formed in one member.

In all three constructions, the valve is adapted to vary the ratio of air admission velocity above and below the partitioning baffle, for the purpose of maintaining the velocity below the partitioning baffle insufficient to disturb the arc when the exhaust system is operating at comparatively high capacity. The higher the exhaust capacity, the wider the valves are opened and the better the sweep through the chimney, notwithstanding the fact that the velocity below the partitioning baffle is maintained at a rate that does not disturb the arc.

As a further advantage of the invention, it may be noted that the upper or valve-controlled air intake means maintains the top of the lamp housing in a cool condition which eliminates a fire hazard and is a decided convenience to the operator.

Although specific embodiments of the invention have been illustrated and described, it will be understood that various alterations in the details of construction may be made without departing from the scope of the invention, as indicated by the appended claims.

What I claim is:

1. In an arc lamp, a housing having a ventilating zone in the upper portion thereof, a flue communicating with said zone, means for admitting air to said zone, and means above the first named means, for admitting air from the atmosphere directly to said flue.

2. In an arc lamp, a housing having a ventilating zone in the upper portion thereof, a flue communicating with said zone, means for admitting air to said zone, and means above the first named means, for admitting air from the atmosphere directly to said flue, and an apertured baffle between said two air admission means.

3. In an arc lamp, a housing having a ventilating zone in the upper portion thereof, a flue communicating with said zone, means for admitting air to said zone, and adjustable means above the first named means, for admitting air from the atmosphere directly to said flue.

4. In an arc lamp, a housing having a ventilating zone in the upper portion thereof, a flue communicating with said zone, means for admitting air to said zone, and adjustable means above the first named means, for admitting air from the atmosphere directly to said flue, and an apertured baffle between said two air admission means.

5. In an arc lamp, a housing having a ventilating zone in the upper portion thereof, a flue communicating with said zone, means for admitting air to said zone, said housing having louvers above said means and communicating with said flue, and a valve between said louvers and said flue for regulating communication between said louvers and flue.

6. In an arc lamp, a housing having a ventilating zone in the upper portion thereof, a flue communicating with said zone, means for admitting air to said zone, said housing having louvers above said means and communicating with said flue, a valve between said louvers and said flue for regulating communication between said louvers and flue, and an apertured baffle between said means and louvers.

7. In an arc lamp, a housing having a ventilating zone in the upper portion thereof, a flue communicating with said zone, said housing having louvers communicating with said zone and another series of louvers above the first named louvers and communicating with said flue, and a valve between the second named louvers and said flue for regulating communication therebetween, and deflectors mounted adjacent to the first named louvers for preventing loss of light through the latter.

8. In an arc lamp, a housing having a ventilating zone in the upper portion thereof, a flue communicating with said zone, said housing having louvers communicating with said zone and another series of louvers above the first named louvers and communicating with said flue, and a valve between the second named louvers and said flue for regulating communication therebetween, deflectors mounted adjacent to the first named louvers for preventing loss of light through the latter, and an apertured baffle between the first named and the second named louvers.

9. In an arc lamp, a housing having a ventilating zone in the upper portion thereof, a flue communicating with said zone, said housing having louvers communicating with said zone and another series of louvers in the roof of the housing and communicating with said flue, and a valve between the second named louvers and said flue for regulating communication therebetween, and deflectors mounted adjacent to the first named louvers for preventing loss of light through the latter.

10. In an arc lamp, a housing having a ventilating zone in the upper portion thereof, a flue communicating with said zone, said housing having louvers communicating with said zone and another series of louvers in the roof of the housing and communicating with said flue, and a valve between the second named louvers and said flue for regulating communication therebetween, deflectors mounted adjacent to the first named louvers for preventing loss of light through the latter, and an apertured baffle between the first named and the second named louvers.

WAYNE D. BRENKERT.